United States Patent [19]

Liljenquist

[11] Patent Number: 4,940,346
[45] Date of Patent: Jul. 10, 1990

[54] KEYBOARD ASSEMBLY AND TYPING METHOD

[76] Inventor: Don C. Liljenquist, 8360 Greensboro Dr., McLean, Va. 22102

[21] Appl. No.: 32,622

[22] Filed: Apr. 1, 1987

[51] Int. Cl.$^5$ ............................................. B41J 5/10
[52] U.S. Cl. ................................. 400/487; 400/486; 400/472
[58] Field of Search ................ 400/472, 486, 487, 82, 400/83, 103, 104, 105, 106, 107

[56] References Cited

U.S. PATENT DOCUMENTS

| | | | |
|---|---|---|---|
| 2,848,088 | 8/1958 | Shaw | 400/104 |
| 3,235,055 | 2/1966 | Pagenkopf | 400/487 X |
| 4,484,305 | 11/1984 | Ho | 400/83 X |
| 4,555,193 | 11/1985 | Stone | 400/487 X |
| 4,558,527 | 12/1985 | Schroedel et al. | 400/718 X |

FOREIGN PATENT DOCUMENTS

| | | | |
|---|---|---|---|
| 3042579 | 5/1982 | Fed. Rep. of Germany | 400/487 |
| 12779 | 1/1983 | Japan | 400/487 |
| 2083670 | 3/1982 | United Kingdom | 400/83 |

OTHER PUBLICATIONS

Scientific American, "Language Translation," Feb. 1979, pp. 4 and 5.
Smith and Corona Typewriter, copyright 1935.

*Primary Examiner*—Edgar S. Burr
*Assistant Examiner*—John S. Hilten
*Attorney, Agent, or Firm*—Sixbey, Friedman, Leedom & Ferguson

[57] ABSTRACT

An improved keyboard assembly and method for typing for use with a device for processing symbolic information, such as a word processor, is disclosed herein. Generally, the improved keyboard assembly comprises a plurality of mutually adjacent keys, each of which is substantially covered by a visual pattern formed from a combination of shape and coloring. The visual pattern on each key is manifestly different from the visual pattern on each adjacent key in order to facilitate visual discrimination between keys. However, the visual patterns on keys in the same rows or columns share at least one distinctive design feature in order to assist the operator in properly orienting his or her hands over the keyboard. To further enhance both key discrimination and proper manual orientation over the keyboard, keys on every other row have different surface textures to provide distinctive tactile signals to the keyboard operator whenever the different-textured keys are touched. Finally, the keyboard assembly may include a document positioner located just above the keyboard so that the keyboard operator may peripherally see the visual patterns on the keys when looking at a document being copied. In the typing method of the invention, the visual pattern associated with each symbol typed is simultaneously displayed in order to reinforce the association of the symbol and the pattern in the mind of the operator. The improved keyboard assembly greatly expedites the learning of typing skills and reading skills by associating a distinct visual pattern with each letter of the alphabet in the mind of the operator.

21 Claims, 5 Drawing Sheets

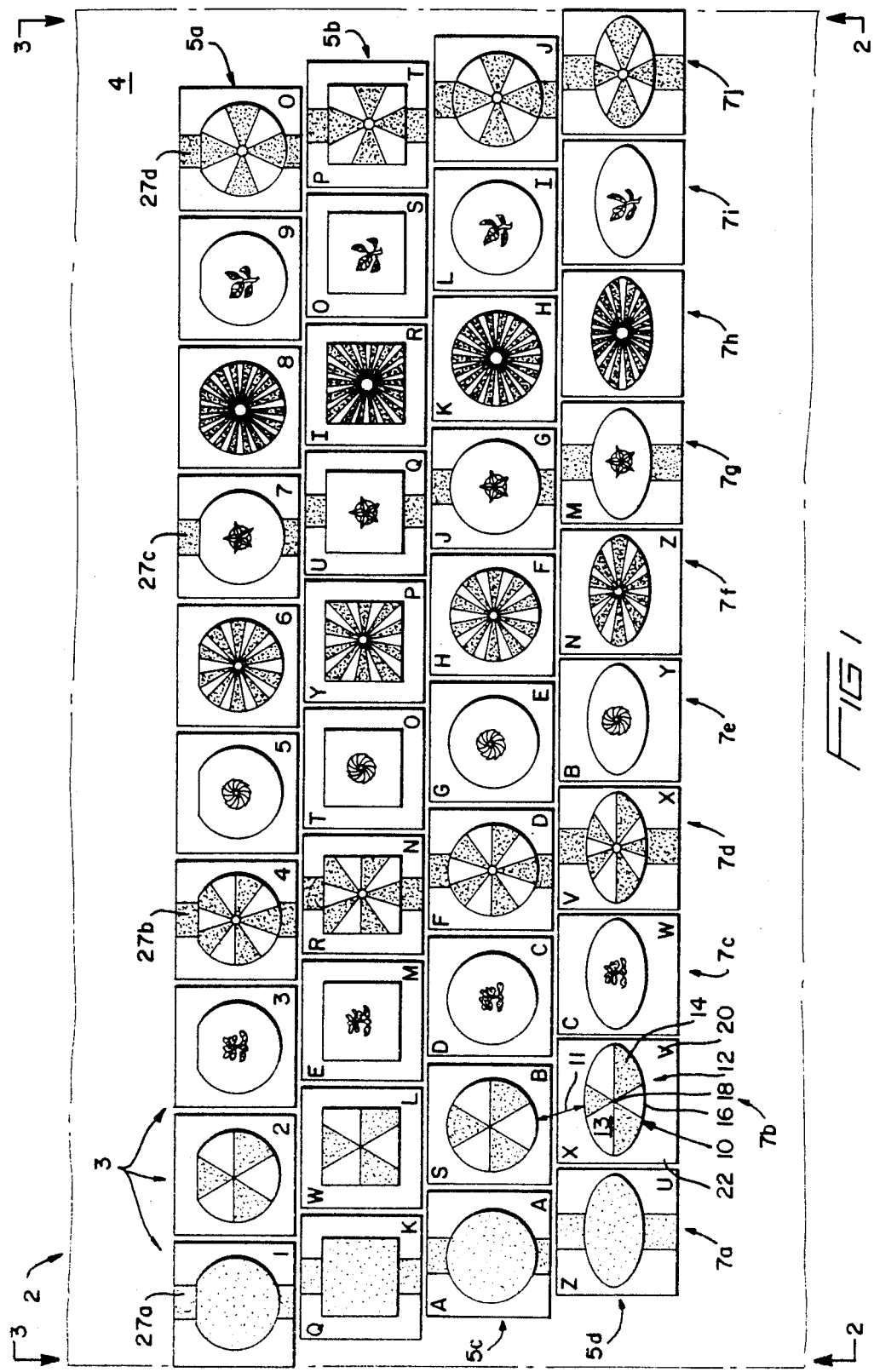

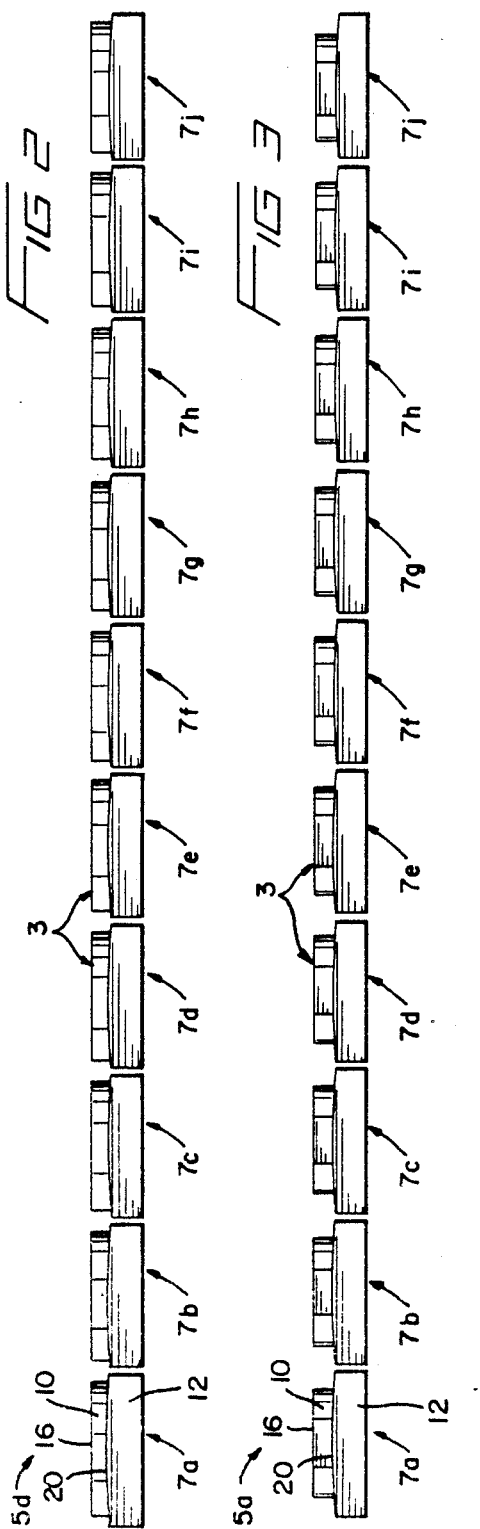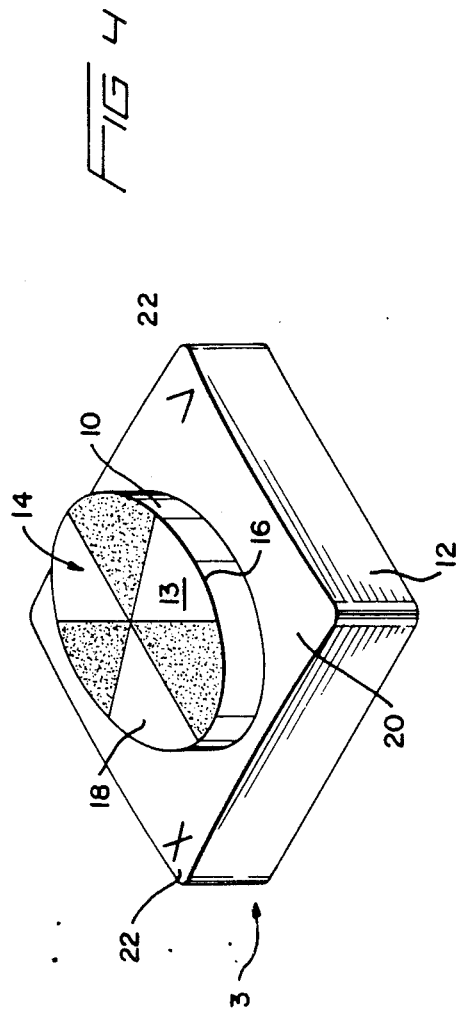

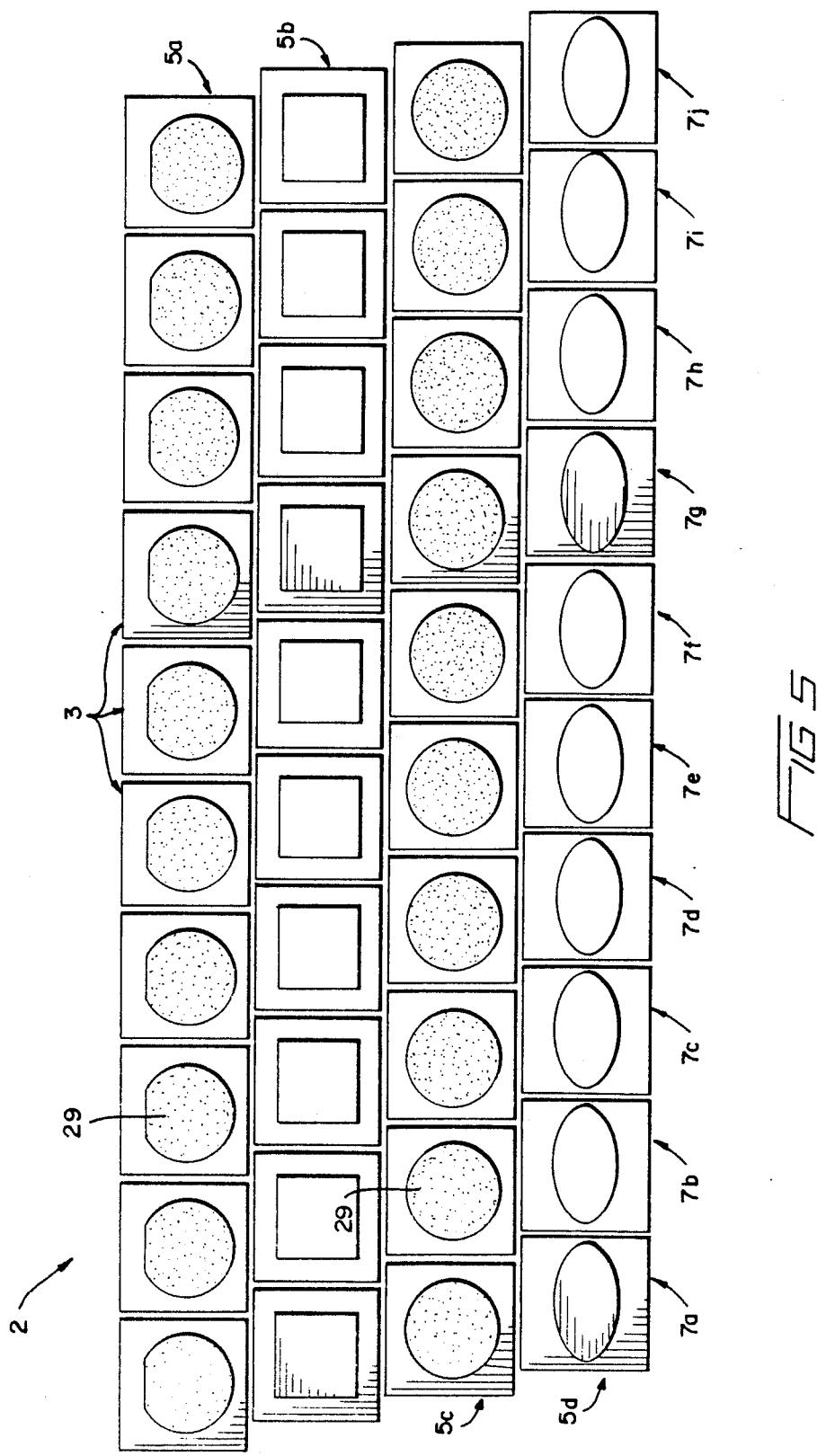

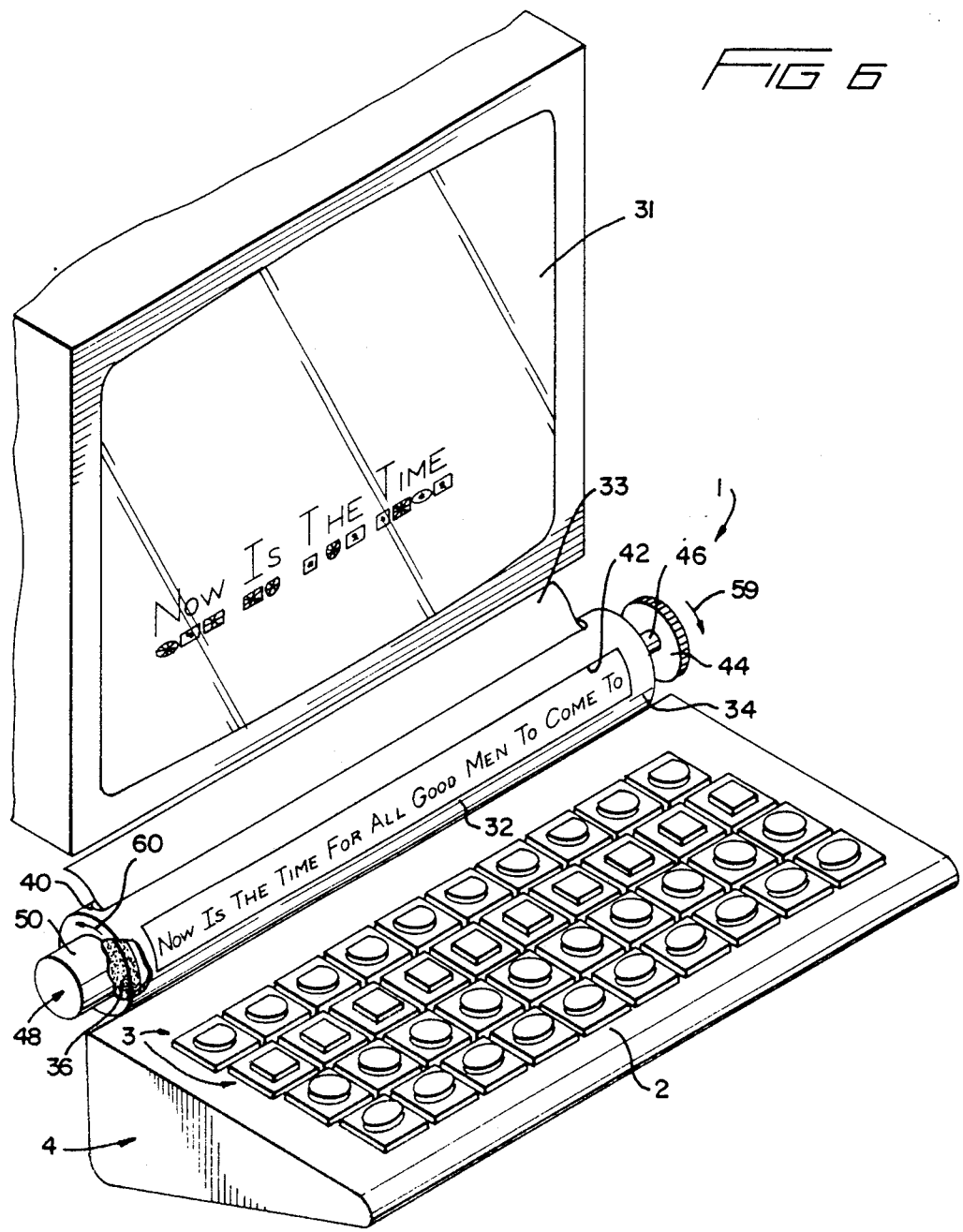

KEYBOARD ASSEMBLY AND TYPING METHOD

BACKGROUND OF THE INVENTION

This invention relates to an improved keyboard assembly and typing method that is particularly useful in connection with a computer terminal, word processor, or typewriter.

In prior art keyboards, all of the keys are substantially the same shape and color, the only discernible difference between adjacent keys being the single letter or number printed upon its upper face. The applicant has observed that there are a number of major disadvantages associated with this conventional key design. For example, it is difficult, if not impossible, for a person learning touch-typing to utilize either peripheral vision or near-focus vision to guide his fingers toward the desired key as he looks at the hard copy or the CRT representation of the document being typed. The only way by which a person learning to type can visually discriminate such prior art keys is by looking directly at them with his focused vision which, of course, is completely incompatible with gaining any touch-typing skill. However, if the novice keyboard operator attempts to use his peripheral or near-focus vision to guide his fingers, the keyboard appears substantially monolithic with no guiding contrasts between either the individual keys or even large groups of keys. Thus the lack of any significant contrast between the keys not only makes it impossible to visually guide one's fingers toward a desired key with the peripheral or near-focus vision, it also makes it extremely difficult for a novice keyboard operator to keep his hands and fingers properly oriented over the home-row during the typing operation. If the person learning to type has dyslexic tendencies which make it difficult for him to quickly and easily visually discriminate between different letters or numbers, the discrimination problem is compounded. Finally, the design of such keys makes it difficult to use the same set of keys in an alternative keyboard arrangement. But before this problem may be fully appreciated, some explanation of keyboard arrangements is necessary.

The most common type of keyboard arrangement in use today is the so-called "standard" keyboard, sometimes called the "QWERTY" keyboard due to the fact that the letters Q-W-E-R-T-Y are located along the upper left-hand end of the third row of keys. This particular keyboard has been criticized on two grounds. First, the keys are not arranged in an easily recognizable pattern, which in turn makes it a difficult keyboard to learn to use. Secondly, the positions of the keys that correspond to the most frequently used letters of the alphabet (which are the vowels) do not correspond to the strongest finger positions of the operator, which are the finger positions over "home row" that includes the letters A-S-D-F-G-H-J-K-L. This shortcoming adversely affects both the maximum typing speed and the accuracy that can be attained by a keyboard operator because of the limited number of words that can be typed without moving the fingers from the home row of keys.

To overcome the shortcomings of the QWERTY-type keyboard, alternative keyboard arrangements have been proposed. One of the best known alternative key arrangements is the so-called Dvorak keyboard. This keyboard arrangement places five vowels on the home row under the left hand and the five consonants used most frequently under the right hand. Tests substantiate an increase of speed and accuracy of about twenty percent because about twenty times as many English words can be typed on the home row as compared to the home row of keys with the Q-W-E-R-T-Y layout.

While no "perfect" keyboard arrangement has yet been developed, alternative arrangements like the Dvorak keyboard offer enough of an improvement over the standard keyboard to justify increased usage by keyboard operators. But increased use of these improved keyboard arrangements has been hampered by the widespread acceptance of the QWERTY keyboard, and the fact that it is difficult to quickly and economically change the key arrangement from QWERTY in most keyboards. Even when the individual keys are manufactured so that they may be pulled off of their respective switching posts, and even if appropriate switching circuitry were added to the typewriter, computer or word processor, the removal, rearrangement and re-installation of the keys from a QWERTY to a Dvorak arrangement would be a tedious, time-consuming and expensive task.

Still another problem associated with prior art keyboard systems is the position at which the copyholder holds the document being copied relative to the keyboard and the platen or CRT screen which is displaying the final typed product. Typically, such copyholders holders are placed beside and apart from both the keyboard and the display of the finished document, which requires the keyboard operator to constantly shift his vision from the document being copied to the document being displayed on the platen or screen. Such constant eye movement impedes the typing rhythm of the keyboard operator, thereby significantly slowing down the speed at which the final document is produced.

Clearly, there is a need for an improved keyboard system which utilizes keys that are easily visually discriminated so that the keyboard operator may use his peripheral or near-focus vision to direct his fingers toward the desired keys while the focused vision examines the document being produced. It would be desirable if such a keyboard had some sort of provision to help persons with dyslexic tendencies to easily visually distinguish different alphanumeric characters, which would not only expedite the acquisition of typing skills, but would enhance reading skills as well. Ideally, such a keyboard system should be versatile, and easily convertible into a Dvorak or other alternative key arrangement from a QWERTY arrangement. Finally, such a keyboard system should incorporate a copyholder that eliminates the need for side-to-side glancing during the typing operation.

SUMMARY OF THE INVENTION

Basically, the invention is an improved keyboard assembly and typing method for use with a device for processing alphanumeric symbols (such as a computer, word processor, typewriter or adding machine) that overcomes the aforementioned deficiencies of prior art keyboards. The keyboard assembly comprises a plurality of mutually adjacent keys, each of which corresponds to a selected alphanumeric symbol, and each of which is substantially covered by a visual pattern formed from a combination of shape and coloring. To facilitate visual discrimination between the keys, the visual pattern on each key is manifestly different from the visual pattern on each adjacent key. The keys may be arranged in mutually adjacent rows and columns. To assist the proper orientation of the hands of the operator over the keyboard, all of the keys in the same rows or the same column may have one design element in common. In the preferred embodiment, each of the visual patterns is formed from a combination of a distinctive shape and a distinctive coloring. The patterns on each of the keys in the same rows have the same shape, while each of the keys on the same columns have the same coloring. The use of visual patterns with distinctive shapes and colorings provides visual guideposts that are readily perceptible by the peripheral and near-focus vision of the keyboard operator during the typing operation.

To further assist the keyboard operator in either discriminating between different keys or in properly orienting his hands over the keyboard, at least some of the keys may include different surface textures, each of which provides a distinctive tactile signal to the keyboard operator whenever they are touched. In one preferred embodiment of the invention, the surface texture of the keys of every other row have a relatively roughened texture. In still another embodiment of the invention, the "home row" of keys may include a surface texture which is manifestly rougher than any of the other keys on the keyboard in order to make it easy for the operator to maintain his fingers in proper orientation with respect to the home row.

Each of the keys may include a finger engageable portion that is integrally formed with and raised above a base portion. The distinctive visual pattern on the key may completely cover the finger engageable portion, thereby providing a dominant visual clue on the key, while the specific symbol to which the key corresponds may be printed or otherwise indicated in one of the corners of the base portion. In the preferred embodiment of the keyboard assembly, each of the keys may correspond to at least two different alphanumeric symbols, each of which is printed onto a separate corner of the base portion so that the same keyboard may be used as either a QWERTY, Dvorak or other alternative keyboard by merely switching the output of the keyboard through appropriate de-coder circuitry. The switching circuitry may either be built into the word processor, computer or typewriter, or may be retrofitted thereon. The different alphanumeric symbols that each key may correspond to may further be indicated in different colors and styles in opposing corners of the base portion in order to enhance visual discrimination between alternative symbols on each key.

The keyboard assembly may further include a copyholder for positioning a document to be copied adjacent to the front end of the keyboard so that the keyboard operator may see the keys of the keyboard with his peripheral or near-focus vision when looking directly at the copy. In the preferred embodiment, the copyholder is formed from a platen journalled within a cylindrical housing. The housing may include a window slot for displaying a selected portion of a document to be copied. A manually operated knob may be connected to one side of the platen to allow the keyboard operator to wind the document to be copied around the platen, while a foot-operated electric motor and drive train may be connected to the other end of the platen for selectively unwinding the document across the window slot in the housing.

Finally, the invention also encompasses a method for learning typing skills which utilizes the keyboard assembly of the invention. In this method, the particular visual patterns associated with the alphanumeric characters being typed are displayed just beneath these characters on the CRT screen in order to reinforce the relationship between these characters and the visual patterns in the mind of novice operator. If the typing students are old enough to be familiar with the alphabet, the sequential arrangement greatly expedites the speed at which they learn to touch-type as it positions the keys in an easily recognized pattern. Additionally, the sequential arrangements provides from two-thirds to three-fourths of the speed and accuracy advantages of the Dvorak keyboard arrangement. If the typing students are very young children, the sequential arrangement advantageously reinforces the child's need to know the alphabet for telephone directory use, dictionary use, etc.

The improved keyboard assembly and method greatly decreases the amount of time necessary for a novice operator to learn to operate an alphanumeric keyboard, and facilitates the acquisition of reading skills by associating a distinctive visual pattern with the individual letters of the alphabet. It is particularly useful in imparting reading and writing skills to persons with dyslexic tendencies.

BRIEF DESCRIPTION OF THE SEVERAL FIGURES

FIG. 1 is a plan view of the improved keyboard used in the keyboard assembly of the invention, illustrating the different visual patterns applied to each of the keys;

FIG. 2 is a side view of the keyboard illustrated in FIG. 1 along the line 2—2;

FIG. 3 is a side view of the keyboard illustrated in FIG. 1 along the line 3—3;

FIG. 4 is an enlarged, perspective view of one of the keys in row 5d and column 7b;

FIG. 5 is a plan view of the keyboard used in the keyboard assembly of the invention with the visual patterns on the individual keys removed in order to illustrate the use of different surface textures on different rows of keys;

FIG. 6 is a perspective view of the keyboard of the invention being used in con]unction with the document positioner of the invention;

Figure 7:
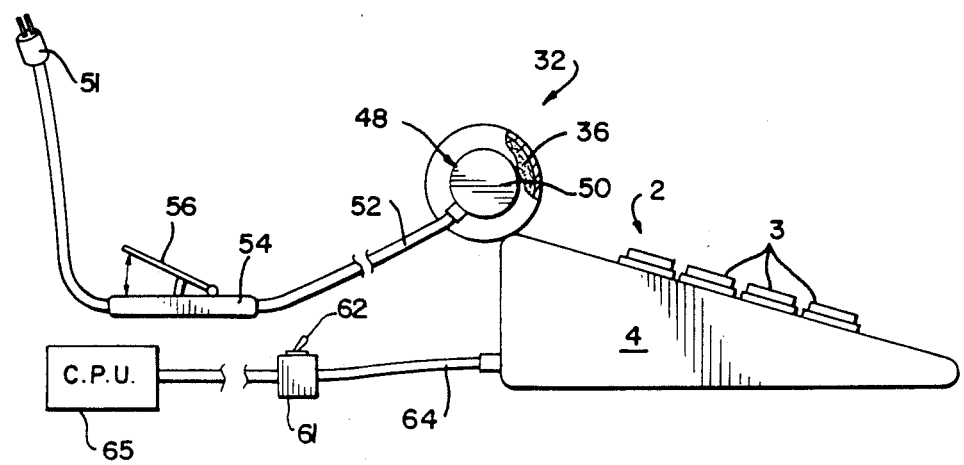
Figure 8:

FIG. 7 is a side view of the keyboard and document positioner illustrated in FIG. 6 showing the interconnection between the electric motor drive of the document positioner and a footswitch, and the interconnection between the keyboard console and a key switching circuit, and FIG. 8 illustrates a preferred method of using the visual patterns of the keyboard to facilitate the learning of touch typing and the strengthening of reading skills.

DETAILED DESCRIPTION OF THE PREFERRED EMBODIMENT

With reference to FIGS. 1, 2 3 and 4 the keyboard assembly 1 of the invention generally comprises a keyboard 2 having an arrangement of keys 3 mounted on a console 4. The arrangement of keys 3 includes four rows 5a–d and ten columns 7a–j. In the preferred embodiment, the keys 3 forming the rows 7a–j are slightly staggered with respect to one another, while the rows 5 are parallel to one another as shown.

With specific reference to FIGS. 1 and 4, each of the keys 3 includes a finger engaging platform 10 mounted over a generally square base 12. The top surface 13 of the finger engaging platform 10 is preferably slightly concave to conform in shape with the fingertips of the user. A visual pattern 14 having a distinctive shape 16 and color scheme 18 covers the top surface of the finger engaging platform 10. To assist the operator in properly orienting his or her hands with respect to the key arrangement 3, the shape 16 of keys in the same row s 5a–d are all the same (i.e., partially circular, square, circular and elliptical), while the color scheme 18 of keys in the same columns 7a–j are likewise all the same. However, in order to assist the keyboard operator in visually discriminating between keys that are directly adjacent to one another (and thereby to avoid one of the most common type of typographical errors committed by novices) the specific combination of shape 16 and color scheme 18 that forms the visual pattern 14 on each of the keys 3 is distinctly different from the shape 16 and coloring 18 used in the visual pattern 14 on all adjacent keys. Specifically, the shapes of the key patterns 14 in adjacent rows 5a–5d are clearly different (i.e, partially circular, square, circular and elliptical), while the color schemes 18 of the key patterns 14 in adjacent columns 7a–j are chosen to afford maximum visual contrast. The color scheme 18 of all of the key patterns 14 in columns 7a, 7c, 7e, 7g and 7i is predominantly a uniform coloring of black, yellow, red, blue and tan, respectively, while the color scheme of all of the key patterns 14 in columns 7b, 7d, 7f, 7h and 7j is a spoke-like arrangement of alternating sectors of black and yellow, red and yellow, red and blue, blue and black, and tan and light gray, respectively. In all color schemes, the red used is equivalent to PMS (or Pantone Matching System) 185 rubine and warm red, the blue used is equivalent to PMS 306 light blue, the grey used is equivalent to PMS 421, and the tan used is equivalent to PMS 465. Additionally, the particular yellow used is equivalent to "process" yellow, while the black is a glossy black. In all cases, the coloring is preferably impregnated directly in the key material, but may also be imbedded or dyed onto the surface 13. The monochrome color scheme 18 in columns 7c, 7e, 7g and 7i may include a centrally disposed flower, pinwheel, star and leaf cluster to enhance the contrast between the keys 3 in these columns and the keys 3 of the rest of the keyboard 2. To further enhance such visual contrast, the number of sectors used in the sectored color scheme 18 in columns 7b, 7d, 7f, 7g and 7i increases from six to ten to twenty to forty-eight and then decreases to a cross-like pattern of eight. The color given is avoided in all the color schemes 18 due to the fact that given is the most difficult color for color-blind persons to acquire any perception of. In all cases, the application of the visual pattern 14 over the top surface 13 of the finger engaging platform 10 results in most of the visible area of the key 3 being covered by a visual pattern formed from a distinctive shape 16 and color scheme 18 that can be easily visually discriminated from all adjacent keys with either the peripheral or the near-focus vision of the operator. As best seen with respect to FIG. 6, the base 12 of each of the keys 3 includes a square top surface or apron 20. To further assist the keyboard operator in discriminating between different rows, the aprons 20 of keys 3 in the same rows 5a–d may be uniformly colored with the same pastel tints. For example, all of the key aprons of row 5a, 5b, 5c, and 5d may be colored cream, pink, pastel blue and pastel yellow. In the preferred embodiment, the cream is equivalent to a 10% screen of process yellow mixed with a 10% screen of PMS 465 tan, the pink used is equivalent to a 10% screen of PMS 185 rubine and warn red mixed with a 10% screen of PMS 421 grey, the pastel blue is equivalent to a 10% screen of PMS 306 blue mixed with a 10% screen of PMS 465 tan, and the pastel yellow is equivalent to a 30% screen of process yellow mixed with a 10% screen of PMS 421 grey. The use of such uniform pastel tints on the key aprons 20 of different rows complements the function of the different shapes 16 given to the visual pattern 14 in different rows in helping the operator to discriminate between the rows without blurring the contrast that the individual color schemes 18 give to adjacent keys 3. As is discussed in more detail hereinafter, the keyboard 2 may be electronically switched from a standard to either a sequential or Dvorak-type keyboard, and each of the alphanumeric symbols that the key 3 may correspond to is printed in a different corner 22 of the square top surface 20. The use of the base 12 instead of the top surface of the finger engaging platform 10 to display a particular alphanumeric symbol that the key 3 corresponds to advantageously allows the simultaneous and unambiguous display of more than one such symbol in the opposing corner 22 of the base 12, thereby making it practical for the same arrangement of keys 3 to be used as a standard, sequential or Dvorak-type keyboard.

With reference again to FIGS. 1 and 5, the keyboard 2 arrangement 3 has two other features which help the keyboard operator in properly orienting his hands over the keys, including vertically oriented, bar-like markings 27a–d along columns 7a, 7d, 7g and 7j of the keys, and a roughened texturing 29 on rows 5a and 5c. The bar-like markings bars 27a–d are printed in black ink over the aprons 20 of the keys in columns 7a, 7d, 7g and 7j. These bar-like markings 27a–d provide a visual guide or index that is easily perceptible in either the peripheral or the near-focus vision of the key operator during the typing operation. The key operator can effectively monitor and adjust the position of his hands with respect to the key arrangement 3 by simultaneously observing the relative position of the hands with respect to the bar-like markings 27a–d during the typing operation. This is particularly useful for novice operators, who tend to move their hands in different positions over the keyboard 2 in order to compensate for their lack of finger "reach" and finger strength when typing letters such Q-Z-P and M on a standard keyboard. The tactile signals provided by the roughened texturing 29 of rows 5a and the "home row" 5c co-acts with the visual index provided by the bar-like markings 27a–d in helping an operator to maintain proper band orientation over the keyboard 2. The roughened texturing 29 on row 5c is of particular importance, as the proper orientation of the fingertips over the "home row" is vital in either learning or performing standard touch typing. In the preferred embodiment, the texturing 29 in rows 5a and 5c is actually molded onto the upper surface of the finger engaging platform 10 of the keys in these rows. Alternatively, Velcro ® sheet material bearing the visual patterns 14 may be detachably mounted over the upper surfaces of the finger engaging platforms 10. The advantage of using such detachable Velcro ® sheet material is that it allows the texturing 29 to be easily replaced when it becomes worn down to the extent to where there is relatively little tactile contrast between the finger engaging platforms 10 of the rows 5a and 5c and the finger engaging platforms 10 of rows 5b and 5d.

With reference to FIGS. 6 and 7, the keyboard assembly 1 of the invention further includes a copyholder 32 for positioning a document to be copied (known in the art as a "copy") between the console 4, and a CRT screen 31 or other mechanism that displays the document being produced. The copyholder 32 is formed from a tubular housing 34 into which a platen 36 is rotatably mounted. A slot 40 is provided at the top end of the copyholder, 32 receiving the edge of the document 33 to be copied. Just below the copy receiving slot 40 is a framing window 42 for displaying the particular information on the document 33 that the keyboard operator is copying. A knob 44 for manually turning the platen 36 is connected to the right-hand end of the platen 36 by way of a stub shaft 46. The other end of the platen 36 is connected to a motor drive 48 that generally comprises an electric motor 50 connected to a wall plug 51 by way of a cord 52. To selectively connect the electric motor 50 to electric power from a conventional wall outlet (not shown) the cord 52 further includes a footswitch 54 having a pedal 56 which, when depressed, actuates the motor drive 48.

In operation, the keyboard operator inserts the document to be copied 33 through the copy slot 40, and winds it around the platen 36 by twisting the knob 44 in the direction indicated by arrow 59. Hence, the mechanical action of the platen 36 and knob 44 in reeling in a sheet of paper is much the same as the platen of a conventional typewriter. When the keyboard operator wishes to use the keyboard 2 to copy the information on the document 33, he merely depresses the foot pedal 56 of the footswitch 54, which causes the motor drive 48 to turn the platen 36 in the direction indicated by arrow 60, thereby unwinding the document 33 from the platen 36. The primary advantage of the copyholder 32 is that it displays the document 33 being copied at a position between the keyboard 2, and the screen 31 of the word processor or computer in such a manner that the keyboard operator can simultaneously see with his peripheral or near-focus vision both the keyboard, the position of his hands over the keyboard 2, the document being typed on the screen 31, and the document being displayed on the copyholder 32. Hence, the speed-impeding lateral glancing associated with prior art copyholders which display the document beside the keyboard 2 and display screen 31 is completely eliminated.

FIG. 7 also illustrates the keyboard switching circuit 61 used in conjunction with the improved keyboard 2 of the invention. In the preferred embodiment, the keyboard switching circuit 61 includes a three-way switch 62, and two separate code converter circuits (not shown) which are capable of converting the alphanumeric signals transmitted through the console output cable 64 into different alphanumeric signals before these signals are received by the central processing unit 65 of the word processor, computer or typewriter. Specifically, one of the code converter circuits converts the alphanumeric signals it receives from a standard keyboard to that of a sequential keyboard, while the other code converter circuit converts such signals to that of a Dvorak keyboard. The code converter circuits may be made from printed circuits or TTL logic chips, and the precise structure and operation that such code circuits may assume is not within the scope of the instant invention. However, applicant would point out that such conversion circuitry per se is well known in the prior art of photocomposition machinery in such references as U.S. Pat. No. 3,067,660, and in multi-lingual typewriters such as shown in U.S. Pat. Nos. 4,124,843 and 4,531,119. The '119 patent discloses the use of a switch to selectively route the signals generated by a keyboard through different circuits that determine the specific type of Asian character ultimately printed, and is expressly incorporated into the specification of this application by reference. Similarly, the three-way switch 62 would either pass the signals generated by the keyboard 2 completely through unaltered when the keyboard 2 is used as a standard keyboard, or through one or the other of the code converter circuits when the keyboard 2 is used as either a sequential or a Dvorak-type keyboard.

In the method of the invention, the three-way switch 62 is set to select an alphabetical keyboard arrangement. Such an arrangement is illustrated in FIG. 1. Starting with the capital A in the QWERTY keyboard, the home row 5c continues to the right in alphabetical order through J. On the row 5b just above the home row 5c, the keys 3 progress from left to right K through T. On the row 5d just below the home row 5c, the alphabetical sequence is concluded left to right U through Z. There are at least two advantages associated with the use of such a sequential or alphabetical key arrangement. First, if the typing students are old enough to be completely familiar with the alphabet, the sequential arrangement greatly expedites the speed at which a novice learns to touch type, since it positions the keys in an easily recognized pattern. Even when the typing students are very young children that are not as familiar with alphabetical order, the sequential keyboard advantageously reinforces the child's need to know the alphabet for telephone directory use, dictionary use, etc. Secondly, the sequential keyboard arrangement captures many of the same advantages discussed with respect to the Dvorak key board arrangement. Specifically, in the sequential arrangement, the three valves A, E and I are on the home row 5c, while the other three valves O, U and Y are struck with the same two fingers that strike the letters A and E. Moreover, two of the most frequently used consonants, G and H, are located on the home row 5c.

To further reinforce the association of the visual patterns 14 of the keys 3 with the alphanumeric characters on the keys, the CRT screen 31 of the keyboard assembly 1 is programmed to display the associated visual patterns 14 directly under the characters being typed. The specific software necessary to display the visual pattern 14 associated with each number or letter could assume any one of a number of easily developed forms, and forms no part of the instant invention. Such a simultaneous display of visual patterns 14 and alphanumeric characters greatly expedites the learning of touch-typing, and helps those persons afflicted with dyslexia or other reading impairments to learn both typing, reading and writing.

While the structure and operation of the inventive keyboard assembly of the invention has been described with respect to a preferred embodiment, numerous alternative embodiments, substitutions and modifications will occur to those of ordinary skill in the art. For example, different visual patterns can be used to achieve the same results of the invention, as could any number of foot-operated copyholder configurations, so long as they display the document 33 being copied between the keyboard 2 and the display screen 31. Additionally, while the method of the invention has been described with respect to the acquisition of typing skills, it is certainly applicable to other operations, such as the programming of a computer or the acquisition of reading skills. As used herein the word "typing" is to be construed in its broadest sense, and is meant to encompass any activity wherein keys or switches corresponding to symbolic information are actuated in order to transmit information, such as the operation of a mathematical calculator, the dialing of a telephone, or the use of an instrument panel of any sort. Similarly, the word "keyboard" is to be construed in the broad sense of encompassing such items as an array of calcular buttons or an instrument panel. All such alternative embodiments, modifications and substitutions are intended to fall within the scope of the invention claimed in this patent.

I claim:

1. An improved keyboard assembly for use with a device for processing alphabetical or numerical information, cmoprising a plurality of keys arranged in a plurality of mutually adjacent rows and columns, wherein each key corresponds to a selected alphanumeric symbol, and is substantially covered by a visual pattern formed from a combination of one of a plurality of color pattern schemes and one of a plurality of shapes wherein the combination of the color scheme and shape forming the visual pattern of each key is different from the combination of color scheme and shape forming the visual pattern on each adjacent key in order to facilitate visual discrimination between said keys, and wherein the shapes of the color schemes of the visual patterns are the same for each key in any given row in the same rows, but different than keys in no row or rows adjacent to said given row in order to assist a keyboard operator with proper manual orientation with respect to the keyboard while at the same time rendering adjacent keys different in the peripheral and near-focus vision of said keyboard operator.

2. The improved keyboard assembly of claim 1, wherein at least some of said keys further include different surface textures to provide a tactile signal to the keyboard operator whenever the different-textured keys are touched in order to assist the operator in maintaining a proper orientation between his hands and the keyboard.

3. The improved keyboard assembly of claim 2, wherein each key includes a finger engageable portion that is flanked by a base portion, and different surface textures cover at least some of the finger engageable portions of the keys.

4. The improved keyboard assembly of claim 1, wherein each key includes a finger engageable portion that is at least flanked by a base portion, and said visual portion covers said finger engageable portion.

5. The keyboard assembly of claim 1, wherein each key may correspond to more than one alphanumeric symbol, each symbol of which is indicated on the key on a portion thereof that is separate from the visual pattern that substantially covers the key.

6. The keyboard assembly of claim 1, wherein the keys in at least two columns include bar-shaped markings in order to assist the keyboard operator with proper manual orientation with respect to the keyboard by facilitating perception of the individual columns of keys in the keyboard.

7. The keyboard assembly of claim 1, further including a copyholder means and a display means for displaying what the keyboard operator types, wherein said copyholder means is disposed between said plurality of keys and said display means so that the operator may see the keys with his near-focus vision while looking at the copyholder means or display means with his focused vision.

8. An improved keyboard assembly for use with a device for processing alphabetical or numerical information, comprising a plurality of keys arranged in a plurality of mutually adjacent rows and columns, wherein each key corresponds to a selected alphanumeric symbol, and is substantially covered by a visual pattern formed from a combination of one of a plurality of color pattern schemes and one of a plurality of shapes, wherein the combination of the color scheme and shape forming the visual pattern on each key is different from the combination of color scheme and shape forming the visual pattern on each adjacent key, and wherein the shape of the visual patterns is the same for all keys in the same row, but different from that of keys in rows adjacent to any given row in order to assist the keyboard operator with proper manual orientation with respect to the keyboard while at the same time rendering adjacent keys perceptively different in the peripheral and near-focus vision of the keyboard operator.

9. The keyboard assembly of claim 8, wherein each key includes a finger engageable portion that is at least flanked by a base portion, and a visual portion covers a finger engageable portion.

10. An improved keyboard assembly for use with a device for processing alphabetical or numerical information, comprising a plurality of keys arranged in a plurality of mutually adjacent rows and columns, each key corresponding to a selected alphanumeric symbol and being substantially covered by a visual pattern formed from a combination of at least two design elements, each of which is readily perceptible in the peripheral and near-focus vision of a keyboard operator, the specific combination that forms the pattern on each key being perceptively different from the combination of design elements used in the visual patterns on all keys adjacent thereto in the peripheral and near-focus vision of said operator in order to facilitate visual discrimination between different keys, each row having one of said at least two design elements in common with all keys of said row and each column having the other of said at least two design elements in common with all keys of said column, no adjacent rows and columns having both design elements in common, thereby facilitating the proper orientation of the hands of the operator over the keyboard.

11. The improved keyboard assembly of claim 10, wherein said design elements include color scheme, and the shape of the outer edge of the color scheme.

12. The improved keyboard assembly of claim 11, wherein the shape of the outer edge of the color scheme is the same for keys in the same row, and the color scheme of the keys is the same for keys in the same column.

13. The improved keyboard assembly of claim 10, wherein at least some of the keys include different surface textures to facilitate tactile discrimination between said keys in order to further assist the operator in maintaining a proper orientation between his hands and the keyboard.

14. The improved keyboard assembly of claim 10, wherein each key includes a finger engageable portion that is at least flanked by a base portion, and a visual portion covers a finger engageable portion.

15. The improved keyboard assembly of claim 14, wherein each key may correspond to more than one symbol, each symbol of which is indicated on a separate part of the base portion.

16. The improved keyboard assembly of claim 15, wherein the finger engageable portion is raised relative to a base portion of the key.

17. The improved keyboard assembly of claim 16, wherein the base portion is rectangular, and said finger engageable portion is disposed substantially over the middle of the base portion, and each symbol that the key may correspond to is indicated in a separate corner of the base portion.

18. The improved keyboard assembly of claim 17, wherein each key may correspond to one of two different alphanumerical symbols which are separately printed in mutually opposing corners of the base portion of the key.

19. The keyboard assembly of claim 10, further including a copyholder means and a display means for displaying what the keyboard operator types wherein said copyholder means is disposed between said plurality of keys and said display means so that the operator may see the keys with his near-focus vision while looking at the copyholder means or display means with his focused vision.

20. An improved keyboard assembly for use with a device for processing information in symbolic form, comprising a plurality of keys arranged in mutually adjacent rows and columns, each key having a finger engageable portion surrounded by a base portion, the finger engageable portion being substantially covered by a visual pattern formed from a combination of at least two design elements including shape and coloring the specific combination of which on any one key results in a visual pattern that is perceptibly different in the peripheral and near-focus vision of a keyboard operator from the patterns substantially covering all keys adjacent thereto in order to facilitate visual discrimination between different keys, the visual pattern on all keys in any given row having a specific one of said two design elements of shape and color in common, and the visual pattern on all keys in a given column having a specific one of the other one of said two design elements of shape and color in common in order to assist the keyboard operator in perceiving individual rows and columns of keys, but no adjacent rows or adjacent columns having both, said design elements in common, thereby facilitating proper orientation of the hands of the operator over the keyboard, wherein each key may correspond to more than one symbol, each symbol of which is indicated on a separate part of the base portion.

21. An improved keyboard assembly for use with a device for processing information in symbolic form, comprising a plurality of keys arranged in mutually adjacent rows and columns each key having a finger engageable portion being substantially covered by a visual pattern formed from a combination of at least two readily perceptible design elements including shape and coloring, the specific combination of which on any one key resulting in a visual pattern that is perceptibly different in the peripheral and near-focus vision of a keyboard operator from the patterns substantially covering all keys adjacent thereto in order to facilitate visual discrimination between different keys, the visual pattern on all keys in a given row having a specific one of said two design elements of shape and color in common, and the visual pattern on all keys in a given column having a specific one of the other one of said two design elements of shape and color in common in order to assist the keyboard operator in perceiving individual rows and columns of keys, but no adjacent rows or adjacent columns having both of said design elements in common, thereby facilitating proper orientation of the hands of the operator over the keyboard, wherein different surface textures are provided on the finger engageable portions of keys in adjacent rows to further assist the keyboard operator in perceiving individual rows of keys.

* * * * *